United States Patent [19]
Medvey et al.

[11] Patent Number: 4,759,825
[45] Date of Patent: Jul. 26, 1988

[54] ROTARY EVAPORATOR

[76] Inventors: Bela Medvey, Prälat Zistlstrasse B, D-8000 München 2; Laszlo Rozsnoki, D-8961 Wildpoldsried, both of, Kemptener Strasse 10, Fed. Rep. of Germany

[21] Appl. No.: 889,104

[22] Filed: Jul. 23, 1986

[30] Foreign Application Priority Data

Jul. 25, 1985 [DE] Fed. Rep. of Germany ....... 3526644

[51] Int. Cl.$^4$ .......................... B01D 3/08; B01D 3/10; B01D 3/42
[52] U.S. Cl. .................................... 202/181; 202/205; 202/238; 203/1; 203/91; 203/DIG. 18; 159/44; 159/DIG. 16; 159/DIG. 40; 137/386; 222/56
[58] Field of Search ...................... 202/181, 185.1, 205, 202/235, 238; 159/23, DIG. 16, DIG. 40, 43.1, 44; 203/1, 91, DIG. 18; 222/56, 40, 363; 137/386

[56] References Cited

U.S. PATENT DOCUMENTS

| | | | |
|---|---|---|---|
| 2,147,977 | 2/1939 | Källe | 137/386 |
| 2,622,062 | 12/1952 | Putt et al. | 202/202 |
| 3,169,912 | 2/1965 | Ferrari et al. | 202/238 |
| 3,219,551 | 11/1965 | Carel et al. | 202/202 |
| 3,347,754 | 10/1967 | Thomas | 202/238 |
| 3,364,731 | 1/1968 | Hook | 202/202 |
| 3,489,651 | 1/1970 | De Pas | 202/238 |
| 3,577,320 | 5/1971 | Randell | 159/44 |
| 3,582,473 | 6/1971 | Barnstead | 202/181 |
| 3,602,395 | 8/1971 | Reeves | 137/386 |
| 3,998,704 | 12/1976 | Follain et al. | 202/202 |
| 4,415,075 | 11/1983 | McNesky et al. | 202/181 |
| 4,444,623 | 4/1984 | Youngner | 202/181 |
| 4,613,412 | 9/1986 | McDermid | 202/202 |

FOREIGN PATENT DOCUMENTS

| | | | |
|---|---|---|---|
| 2105467 | 3/1983 | United Kingdom | 137/386 |
| 0558683 | 6/1977 | U.S.S.R. | 203/1 |

OTHER PUBLICATIONS

Belle et al., "Constant Level Device for Batchwise Distillation", Analytical Chemistry, vol. 47, No. 3, pp. 606–607.

Primary Examiner—David L. Lacey
Assistant Examiner—Aran V. Manoh
Attorney, Agent, or Firm—Seed and Berry

[57] ABSTRACT

The invention relates to a rotary evaporator for carrying out a processor-controlled distilling operation. A rotary flask (5), a condenser (8) and a distillate collector receptacle (10) of the rotary evaporator (1) are continually kept under vacuum.

According to the invention, the automatically controlled supply of a sample solution to the rotary flask is accomplished by means of a metering receptacle adapted to have the sample solution supplied thereto from a supply container for temporary transitory storage therein prior to transfer of the solution to the vacuum system, or the rotary flask (5), respectively. For discharging the distillate from the distillate collector receptacle (14), an outlet valve associated therewith is operable to connect the collector receptacle to a vacuum conduit (26) for the discharge of the distillate. This provision offers the advantage of permitting substantially discharge of the distillate without requiring the vacuum system to be vented. In an independent advantageous embodiment this is accomplished by the provision of an additional discharge receptacle positioned below the distillate collector receptacle and adapted to be separated therefrom by means of a non-return valve adapted to be closed when the distillate is being discharged from the discharge receptacle (45).

17 Claims, 5 Drawing Sheets

ROTARY EVAPORATOR

TECHNICAL FIELD

The present invention relates to a rotary evaporator for the processor-controlled distillation of a sample solution under vacuum, comprising a rotary flask, a condenser, and a distillate collector receptacle, said rotary flask, said condenser and said distillate collector receptacle forming a closed common-vacuum system during operation.

BACKGROUND ART

It is known to control the substantially automatic operation of a rotary evaporator by means of a processor in such a manner that the distillation process proceeds in a substantially automatized sequence. A main component of a rotary evaporator is a rotary flask adapted to be rotated about its longitudinal axis by a motor operatively connected in most cases to a neck portion of the flask. The sample to be distilled is filled into the rotary flask. In a known system the flask floats in a temperature-controlled heating bath.

The flask is connected to a condenser and a distillate collector receptacle in a closed vacuum system. Heating of the rotary piston in the heating bath causes the sample solution to be concentrated by evaporation. The vapors are condensed in the condenser and collected in the distillate collector receptacle. For enabling a sample to be automatically evaporated to a desired concentration and a desired amount, the rotary flask of an already known processor-controlled rotary evaporator is additionally mounted for pivotal movement about an axis adjacent its neck, thereby enabling it to be immersed in the heating bath to a varying depth, depending on the sample volume. The angle to which the flask is pivoted relative to a predetermined axis may be detected by means of a sensor, for instance a potentiometer. The potentiometer signal varies in response to the filling amount, so that in principle it is possible in this manner to meter or to determine the amount of the sample filled into the flask by determining its pivot angle. It is thus possible to determine the time at which for instance a solution has been evaporated to a desired concentration to which the processor has been pre-set, whereupon the apparatus may be automatically switched off.

This system is disadvantageous in the first place, in that the pivotal mounting of the rotary flask permitting it to be immersed into the heating bath to a varying depth requires the employ of a flexible seal which has to be vacuum-tight. In addition, different sample solutions having different specific weights require different calibrations of the apparatus, because a given amount of a solution having a higher specific weight results in a greater immersion depth of the flask, and thus in a greater pivot angle as measured by the sensor, than the same amount of a solution having a lower specific weight. This metering system for automatically filling the rotary flask is thus highly complicated and cumbersome.

A further, disadvantage of the known rotary evaporator results from the fact that its operation has to be interrupted for emptying the distillate collector receptacle. As the entire system operates under vacuum, the distillate collected in the distillate collector receptacle of the known rotary evaporator can only be drained therefrom after the vacuum system has been vented. The resulting downtimes during which the apparatus is out of operation are particularly annoying when greater amounts of a sample solutions are to be distilled.

DISCLOSURE OF THE INVENTION

It is therefore an object of the invention to improve a rotary evaporator of the type defined in the introduction with a view to automatic control of its operation.

To attain this object in a rotary evaporator of the type set forth in the generic clause of claim 1, the invention provides that a sample supply passage leading to the rotary flask is provided with a valve-controlled sample metering receptacle for channelling a sample into the rotary flask within the vacuum system, and that for reclaiming the distillate from the distillate receptacle, the outlet thereof is provided with an outlet valve operable to connect the outlet of the distillate receptacle to a vacuum conduit for reclaiming the distillate. The provision of a sample metering receptacle in the sample supply passage for instance from a supply container from which the sample is transmitted to the rotary flask permits any desired filling amount to be simply and accurately metered and the complicated pivotal mounting of the rotary flask as in prior art to be eliminated. The sample is supplied to the valve-controlled sample metering receptacle for instance up to a predetermined filling level. The inflow of the sample may then be interrupted as by means of a valve, whereupon a valve leading to the vacuum system may be opened to permit the sample solution temporarily stored in the metering receptacle to enter the vacuum system and to flow into the rotary flask. This sample supply method is extremely simple and accurate and can be accomplished in a simple manner by opening and closing respective valves under the control of a processor.

The provision of an outlet valve at the outlet side of the distillate collector receptacle for connecting the outlet of the receptacle to a vacuum conduit for draining the distillate permits samples to be taken from the distillate collector receptacle without having to vent the vacuum system. The generation of a suitable vacuum in the vacuum conduit leading away from the distillate collector receptacle permits the distillate to drain from the collector receptacle. The outlet valve may then be closed for instance on attainment of a predetermined minimum filling level, so that the vacuum in the vacuum system is always maintained. This permits the distillate to be continuously and automatically reclaimed in a simple manner and without venting the vacuum system, so that the operation of the system, i,e. the distillation process, does not have to be interrupted for draining the distillate. This results in a corresponding reduction of the operating time required for the evaporation particularly of greater amounts of a solution. As a further advantage, this provision permits the evaporation of solutions which would otherwise be adversely affected by periodic contact with air.

In an advantageous embodiment of the invention the valve-controlled sample metering receptacle is a vacuum-connected metering flask adapted to be opened and closed, respectively, at its sample supply side and at its outlet side leading to the vacuum system. A vacuum-connected or evacuated metering flask offers the advantage, on the one hand, that it aspirates the sample from the supply container all by itself as soon as the connection between the supply container and the metering flask is opened. When opened towards the outlet side after the metering flask has been filled, the sample solution column is completely drained therefrom towards the vacuum system by the action of gravity, so that the filling of the metering flask as well as its draining towards the rotary flask can be controlled in an extremely simple manner.

In this context it is of further advantage to provide a connecting conduit between the metering flask and the vacuum system for generating the vacuum within the metering flask, the connecting conduit extending into the metering flask in the form of a suction pipe terminating adjacent the upper end of the flask. This provision permits the metering flask to be connected to the vacuum system formed by the rotary flask, the condenser and the distillate collector receptacle, so that the metering flask does not require a separate conduit connecting it to a vacuum pump or even a separate vacuum pump. In addition, the residual pressures prevailing in the metering flask and in the vacuum system are equal, so that the sample solution contained in the metering flask will always flow into the rotary piston by the action of gravity.

A structurally simple solution and control capability is ensured by the provision that the bottom of the metering flask is formed with an opening connected to a three-way valve operable to selectively connect the opening to the sample supply side or to the outlet side. In this manner, the sample is introduced into the metering flask and drained therefrom through its bottom, only a single three-way valve being required for the respective control operations. The three-way valve may be operated by a servomotor under the control of the processor.

The metering flask is advantageously provided with sensors for determining a maximum and a minimum filling level. These sensors permit the filling and draining of the flask to be monitored, so that the requisite operations may be automatically stopped and initiated, respectively, when the sensors apply corresponding signals to the processor.

In another embodiment the invention provides that the sample metering receptacle is formed with a chamber adapted to have the sample supplied thereto, and that the bottom of the chamber is formed with a first opening communicating with a cavity connected to the vacuum system via a second opening aligned with the first opening and communicating with the sample outlet side, a rotary piston sealingly mounted in the cavity being formed with a metering chamber adapted on rotation of the rotary piston to alternately communicate with the first opening and the second opening. A sample metering receptacle of this construction permits predetermined metered amounts of the sample to be transferred from the chamber to the outlet side by rotation of the rotary piston. The piston seals the chamber against the vacuum of the vacuum system acting on the outlet side. The revolutions of the piston may be measured or counted by means of a conventional device so as to obtain an accurate indication of the amount of the solution transferred to the rotary flask. The metered amounts per time unit may be continuously varied by varying the rotary speed of the rotary piston. The sample solution may be supplied to the chamber of this sample metering receptacle from a supply container as by means of a squeeze pump.

A further embodiment is characterized in that for supplying the sample to the sample metering receptacle there is provided a pump operable to fill the metering receptacle up to an overflow level, and that the sample metering receptacle is adapted to be emptied into the vacuum system through a three-way valve down to a minimum filling level under the control of a sensor. In this embodiment the sample metering receptacle is not evacuated, but is filled up to an overflow level by means of a squeeze pump. When the three-way valve is opened to connect the interior of the receptacle to the vacuum system, the resulting drain operation is controlled in such a manner that it proceeds only until a minimum filling level is attained. The sample solution remaining in the sample metering receptacle acts as a barrier preventing the atmospheric pressure prevailing in the metering receptacle from entering the vacuum system.

In an advantageous modification the invention provides that the vacuum conduit connected to the distillate collector receptacle is in the form of a hose cooperating with a squeeze pump operable to generate the vacuum for draining the distillate and at the same time acting as an outlet valve. Rotation of the hose squeeze pump causes a vacuum to be generated in the conduit to thereby reclaim the distillate from the distillate collector receptacle and to feed it to the hose conduit. Since in its inoperative state the squeeze pump acts to squeeze the hose off, it functions at the same time as an outlet valve, i.e. it prevents atmospheric pressure from entering the distillate collector receptacle.

In this case it is of further advantage to sense at least the minimum filling level in the distillate collector receptacle by means of a sensor emitting a signal for stopping operation of the pump when the minimum filling level is attained. In this manner it is avoided that the pump completely empties the vacuum conduit.

A further embodiment of the invention is characterized in that the sample metering receptacle is formed as part of a cylinder for a reciprocating piston operable in a first direction of travel to aspirate a sample through a switch valve and an opening formed adjacent one end of the cylinder, and in a second direction of travel, to displace the sample towards the rotary flask through the same opening and the switch valve in the reversed state thereof, the other end of the cylinder being formed with a further opening connected to the vacuum conduit by way of the outlet valve, the piston being operable during travel in the second direction to generate the vacuum, and on travel in the first direction, to discharge the distillate through a discharge valve with the outlet valve in its closed state. In this embodiment the metering of the sample and the discharge of the distillate are accomplished by a substantially unitary structural unit, namely, a cylinder with a reciprocating piston. The reciprocation of the piston may be accomplished by means of a motor suitably controlled by the processor. In operation, one part of the cylinder is periodically employed as the sample metering receptacle, while the other part is used for discharging the distillate by the action of the piston. The switch valves may be controlled independently of the piston movement, so that the distillate is not always discharged at the same time the sample solution is metered and vice versa. The switch valves employed in this embodiment may be two-way valves operable to alternately connect the cylinder with the respective conduits. The employ of such a switch valve on the discharge side permits the outlet valve and the discharge valve to be combined in a single valve.

In accordance with the invention the stated object may also be attained by a rotary evaporator of the type defined in the generic clause of claim 1, wherein the vacuum conduit opens into a discharge receptacle adapted to be selectively connected to a vacuum or to at least atmospheric pressure, the outlet valve being formed as a non-return valve adapted to close at a predetermined overpressure in the discharge receptacle. This embodiment permits a continuous and automatic discharge of the distillate in a safe and advantageous manner without venting the vacuum system. The characteristic feature of this embodiment consists in that a further receptacle is provided below the distillate collector receptacle and connected thereto via the vacuum conduit, so that during operation the vacuum of the vacuum system also prevails in the discharge receptacle as long as there is no distillate discharge. In this embodiment, the distillate flows through the distillate collector receptacle into the discharge receptacle. The discharge receptacle can be connected to at least atmospheric pressure, preferably however to an overpressure source, for discharging the distillate therefrom. This causes the non-return valve in the vacuum conduit from the distillate collector receptacle to close, so that the distillate is now collected in the collector receptacle. The distillate may be discharged from the discharge receptacle with the aid of an overpressure, or may be drained therefrom through a bottom outlet. After the discharge receptacle has been thus emptied, it is again connected to a vacuum, so that the non-return valve opens again and the distillate temporarily stored in the distillate collector receptacle flows into the discharge receptacle The volume of the discharge receptacle is preferably greater than that of the distillate collector receptacle. The time required for emptying the discharge receptacle is relatively short, so that a relatively small-volume distillate collector receptacle is sufficient for temporarily storing the distillate.

In this embodiment the automatic discharge may be controlled by the use of sensors responsive to a maximum and a minimum filling level of the distillate in the discharge receptacle including the conduit from the collector receptacle.

In this context an advantageous modification provides that the conduit by way of which the vacuum or the overpressure is generated in the discharge receptacle is provided with a non-return valve which opens by the action of overpressure in the discharge receptacle. The non-return valve is normally closed, but permits the distillate to be pumped off or chased from the discharge receptacle when the overpressure required for the discharge is generated therein.

BRIEF DESCRIPTION OF THE DRAWINGS

Advantageous embodiments of the invention shall now be described in detail with reference to the accompanying drawings, wherein.

BEST MODE FOR CARRYING OUT THE INVENTION

Figure 1:
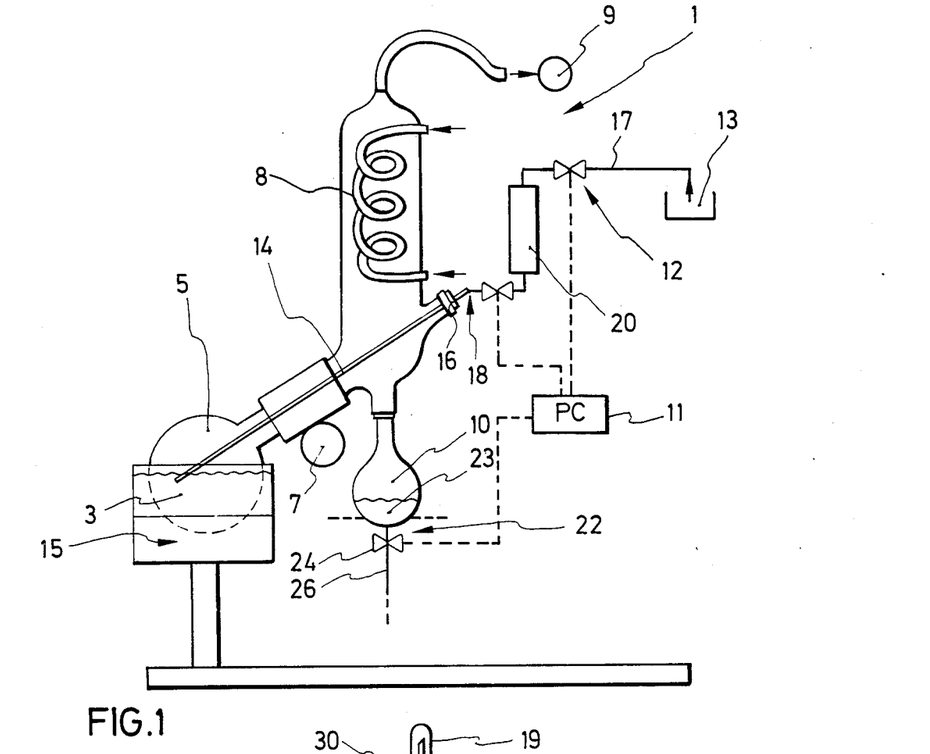
FIG. 1 shows a diagrammatic view of a rotary evaporator according to the invention illustrating its operating principle.

Shown in FIG. 1 is a rotary evaporator according to the invention generally designated 1. Rotary evaporator 1 has a rotary flask 5 adapted to be rotated about its longitudinal axis by a motor 7. Rotary flask 5 is immersed in a container in which a liquid or heating bath 15 is maintained. The liquid level and/or the temperature of the heating bath may be automatically controlled.

Rotary flask 5 is connected to a condenser 8 by a pressuresealed connection. Suspended from the lower end of condenser 8 is a distillate collector receptacle 10, likewise by a pressure-sealed connection. Rotation of rotary flask 5 in the known manner causes a sample solution 3 contained in flask 5 to be uniformly heated to be evaporated thereby. the distillate condensed in condenser 8 flows into collector receptacle 10 to be collected therein.

Rotary flask 5, condenser 8 and collector receptacle 10 are interconnected to form a pressure-sealed system evacuated by means of a vacuum pump 9 via a common evacuation conduit.

The distillation process to be performed by the rotary evaporator is controlled by a processor PC 11. Processor PC 11 is designed for storing various data required for the distillation operation, for instance the amounts of the sample solution to be metered into the system, whereupon the processor automatically controls the periodic metering of the sample solution and the discharge of the distillate.

The sample solution to be distilled is contained in a supply container 13 disposed on the supply side 12 of the system. From supply container 13 the solution is fed to a sample metering receptacle 20 to be temporarily stored therein. For explaining the principle of operation, the drawing shows respective valves upstream and downstream of the metering receptacle, to indicate that the supply of the sample solution to the metering receptacle and its conveyance to the rotary flask on the outlet side 18 is controlled by valves operated under the control of processor PC 11. Sample metering receptacle 20 is operable to meter the sample solution to be distilled and to channel metered amounts of the solution into the vacuum system through a charging pipe 14 and a pressure-sealed lead-in connection 16 at its outlet side 18. The sample metering receptacle can be controlled in a simple manner for accurately metering preselected amounts of the sample solution and channelling them into the system.

The discharge end 22 of distillate collector receptacle 10 is connected to a vacuum conduit 26 adapted to have a vacuum generated therein in any of several manners to be described. A diagrammatically indicated outlet valve 24 is operable to open and close under the control of processor 11 for discharging the distillate 23 without requiring the vacuum system formed by rotary flask 5, condenser 8 and collector receptacle 10 and evacuated by vacuum pump 9 to be vented. This permits the installation to continue its operation also during discharge of the distillate.

Figure 2:
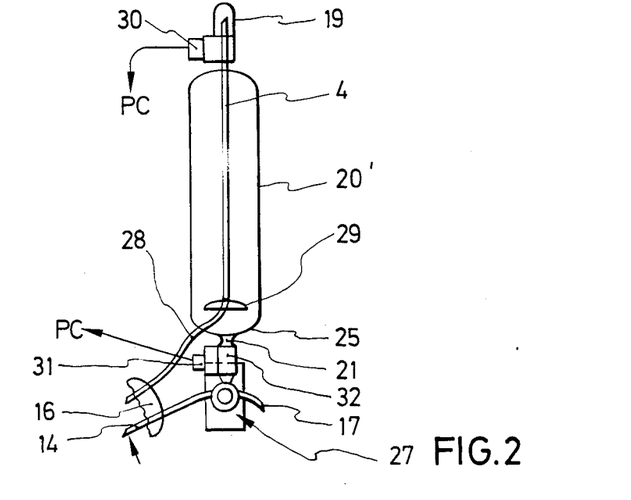
FIG. 2 shows a sample metering receptacle in one embodiment of the invention.

FIG. 2 shows a first embodiment of a sample metering receptacle according to the invention. In this embodiment the metering receptacle comprises a metering flask 20' adapted to have a vacuum maintained therein by being connected to the vacuum system via a connection conduit 28 and lead-in connection 16. Connection conduit 28 enters metering flask 20' through a sealed opening and extends thereinto in the form of a suction pipe 4 terminating adjacent the upper end 19 of metering flask 20'. The bottom 25 of metering flask 20' is formed with an opening 21 having a three-way valve 27 connected thereto. Three-way valve 27 is operable to selectively connect opening 21 to a conduit 17 from supply container 13 (cf. FIG. 1) or to charging pipe 14 extending into rotary flask 5 through lead-in connection 16. Three-way valve 27 is operable by a diagrammatically shown servo motor 32 under the control of signals suitably supplied thereto by processor 11. Sensors 30 and 31 are disposed adjacent the upper and lower ends, respectively, of metering flask 20' for sensing a maximum and a minimum filling level, respectively.

A splash baffle 29 is provided for avoiding excessive bubble formation as the sample solution enters flask 20'.

This embodiment operates as follows for metering the sample solution:

The amount to be metered is pre-set in a counter of processor 11. After the operating program has been started, processor 11 also generates suitable signals for the discharge of the distillate and replenishment of the heating bath. At the beginning of the program, vacuum pump 9 is operated to generate a vacuum in the system. As metering flask 20' is connected to the vacuum system via conduit 28, the vacuum prevailing in the system is likewise present in flask 20'. Servo motor 32 is then operated to adjust three-way valve 27 to its position connecting the conduit from supply container 13 to the interior of flask 20'. The vacuum prevailing in metering flask 20' is effective to aspirate the sample solution from supply container 13 until sensor 30, which is preferably a capacitive sensor, as are all of the sensors to be mentioned as the description proceeds, applies a signal to processor 11 for operating three-way valve 27 to close opening 21. Metering flask 20' now contains a known amount of the sample solution which is already degassed due to the vacuum aspiration, so that it accurately corresponds to the amount to be metered. Servo motor 32 is then operated to adjust three-way valve 27 to its position connecting opening 21 to the conduit leading to rotary flask 5. As a result, the sample solution flows into rotary piston by the action of gravity on the liquid column in metering flask 20'. As soon as sensor 31 senses the minimum filling level, three-way valve 27 is again closed preparatory to a further metering cycle.

The filling level in rotary flask 5 may be monitored by a BO further not shown sensor provided adjacent rotary flask 5. When this sensor indicates an excessively low filling level while at the same time a metering counter counting the filling and discharging cycles of metering flask 20' indicates that the pre-set metering amount has not yet been attained, a further filling cycle is initiated, provided that sensor 31 indicates the minimum filling level. If in a preceding metering cycle metering flask 20' has not been completely emptied due to the sensor associated to rotary flask 5 having indicated the desired filling level in rotary flask 5 before metering flask 20' had been completely emptied, replenishment of metering flask 20' is not yet required. The metered discharge from metering flask 20' may thus be continued without replenishment until sensor 31 indicates that the minimum filling level has been attained.

Figure 3:
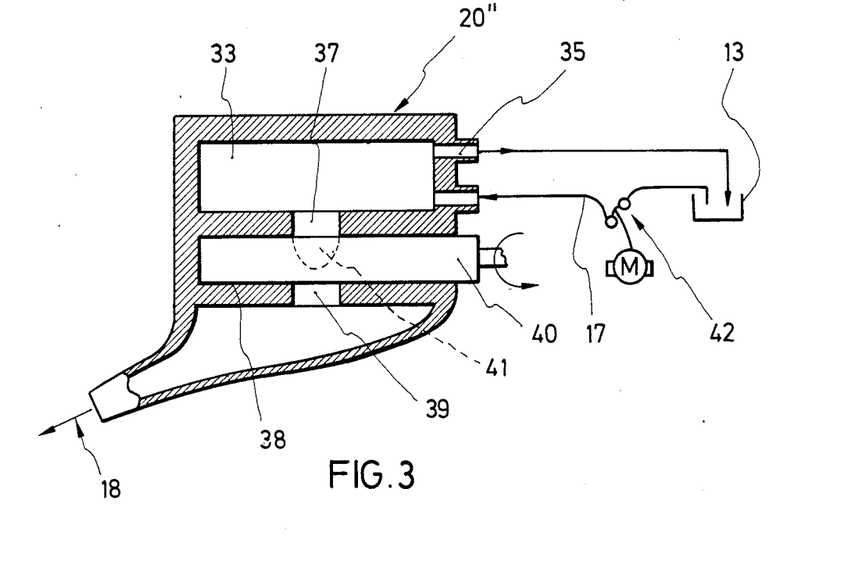
FIG. 3 shows another embodiment of a sample metering receptacle according to the invention.

Another embodiment of the sample metering receptacle 20" is shown by way of example in FIG. 3. This sample metering receptacle 20" comprises a chamber 33 to which the sample solution is supplied from supply container 13 via conduit 17 by means of a squeeze pump 42. Provided at the upper end of chamber 33 is an overflow 35 for returning excessive sample solution to supply container 13 after the proper filling level has been attained. The bottom of chamber 33 is formed with an opening 37 leading into a cavity 38 having a rotary piston 40 mounted therein so as to be sealingly closed thereby. Rotary piston 40 thus acts as a sealing valve between chamber 33 and discharge side 18 leading towards rotary flask 5.

Rotary piston 40 is formed with a metering chamber 41 in the form of a recess having a predetermined volume of for instance x ccm. When metering chamber 41 is disposed below opening 37, the sample solution flows into the recess, whereupon rotary piston 40 is rotated to align metering chamber 41 with a second opening 39 of metering receptacle 20", whereby the known amount of the sample solution contained in metering chamber 41 is permitted to flow off towards the discharge side 18. Rotary piston 40 is thus rotatively operable to periodically transfer metered amounts of the sample solution from first opening 37 to second opening 39. The metered amount per unit of time may be determined in a simple manner by suitably selecting the rotational speed of rotary piston 40. Rotary piston 40 is additionally effective to sealingly separate the vacuum of the vacuum system prevailing on the discharge side 18 from the atmospheric pressure in chamber 33. The present embodiment does not require the use of sensors for indicating the filling level, as chamber 33 is always kept in the filled state by means of squeeze pump 42.

Figure 4:
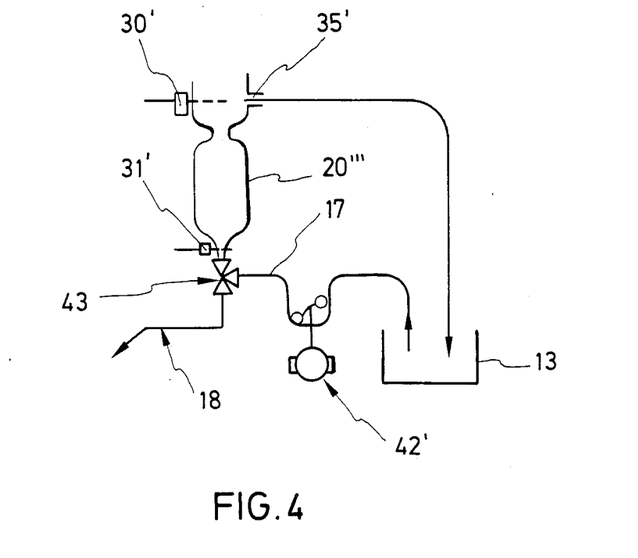
FIG. 4 shows still another embodiment of a sample metering device according to the invention.

A further embodiment shall now be described with reference to FIG. 4. In this embodiment the sample metering receptacle 20''' is a flask which is open to atmosphere. Provided at the lower end of metering flask 20''' is a three-way valve 43 operable to selectively connect flask 20''' to supply container 13 or to discharge side 18. Conduit 17 from supply container 13 to metering flask 20''' is provided with a squeeze pump 42' for the transfer of the sample solution In the filling position of three-way valve 43 squeeze pump 42' is operable to fill metering flask 20''' up to an overflow 35'. When the proper filling level is attained, sensor 30' generates a signal for stopping operation of squeeze pump 42'. Three-way valve 43 may then be operated to connect metering flask 20''' to discharge side 18 leading towards rotary flask 5. The vacuum prevailing in the system then causes the liquid column in the metering flask to drop as long as three-way valve 43 remains in this position. After the contents of the metering flask have been thus metered, minimum filling level sensor 31' generates a corresponding signal for initiating a further filling cycle as explained above with reference to FIG. 2.

Figure 5:
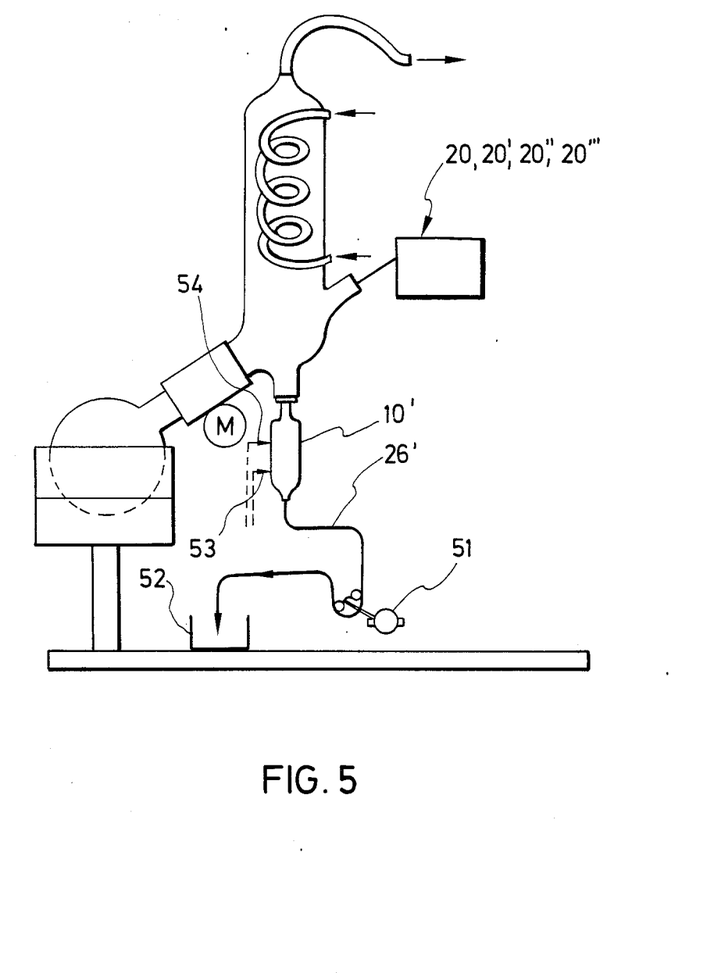
FIG. 5 shows a rotary evaporator according to the invention with an embodiment of a distillate discharge device.

An embodiment of an arrangement for discharging the distillate from the distillate collector receptacle shall now be described with reference to FIG. 5. In this embodiment the distillate collector receptacle comprises an elongate flask 10' having vacuum conduit 26' connected to its lower end. Vacuum conduit 26' is provided with a squeeze pump 51 adapted to be activated when a sensor 54 senses a maximum filling level in flask 10'. Squeeze pump 51 then operates to transfer the distillate into a distillate container 52 until a sensor 53 senses a minimum filling level to have been attained in flask 10', whereupon the operation of squeeze pump 51 is stopped. Squeeze pump 51 is thus operable to generate the required vacuum in vacuum conduit 26' and additionally acts as a closure valve for sealing vacuum conduit 26' against ambient pressure. The squeeze pump is thus capable of discharging the distillate without requiring the system to be vented.

Figure 6:
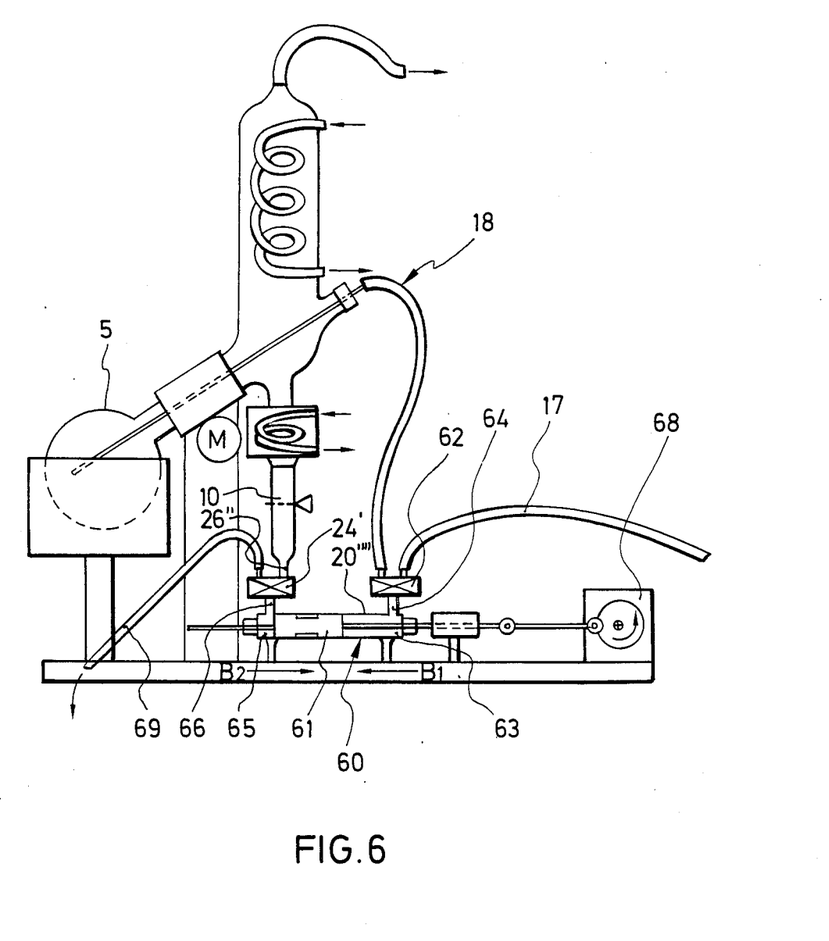
FIG. 6 shows a rotary evaporator according to a still further embodiment of the invention.

In the embodiment shown in FIG. 6, the metering of the sample solution and the discharge of the distillate are substantially accomplished by means of a single unit, namely, a cylinder 60 having a piston 61 mounted therein for reciprocating motion by the action of a drive motor 68. The directions of the piston displacements are indicated at B1 and B2, respectively. One end 63 of cylinder 60 is formed with an opening 64 having a switch valve 62 mounted thereon. In one position switch valve 62 connects the conduit from the not shown supply container to opening 64 of cylinder 60. In a second position cylinder 60 is connected to discharge side 18. At the other end 65 of cylinder 60 there is provided another opening 66 likewise having a switch valve mounted thereon. In one of its position this switch valve acts as an outlet valve connecting, vacuum conduit 26" from distillate collector receptacle 10' to the left-hand portion of cylinder 60 in FIG. 6. In the other position of the switch valve the respective portion of cylinder 60 is connected to a distillate discharge conduit 69.

In this embodiment the metering of the sample solution is initiated by opening switch valve 62 when piston 61 is in its righthand end position in cylinder 60. Subsequent displacement of piston 61 to the left causes the sample solution to be aspirated via conduit 17. In this case, piston 61 may be displaced to the left for a selectively determined stroke corresponding to the desired amount to be metered, or the displacement may proceed to the lefthand end position shown in the figure. For the transfer of the metered amount, switch valve 62 is reversed and piston 61 is moved to the right by a distance corresponding to the amount to be metered so as to displace the sample solution towards the discharge side leding to rotary flask 5.

For discharging the distillate the switch valve acting as outlet valve 24' in vacuum conduit 26" is switched to a position in which vacuum conduit 26" is connected to cylinder 60. Subsequent displacement of piston 61 to the right causes an amount of the distillate corresponding to the piston stroke in the direction B2 to be aspirated from distillate collector receptacle 10. After the switch valve has subsequently been switched over, piston 61 is advanced in the direction of arrow B1 so as to displace the aspirated amount of the distillate via distillate discharge conduit 69 towards a distillate container (not shown). The piston stroke may again be controlled by the use of suitably positioned sensors.

Figure 7:
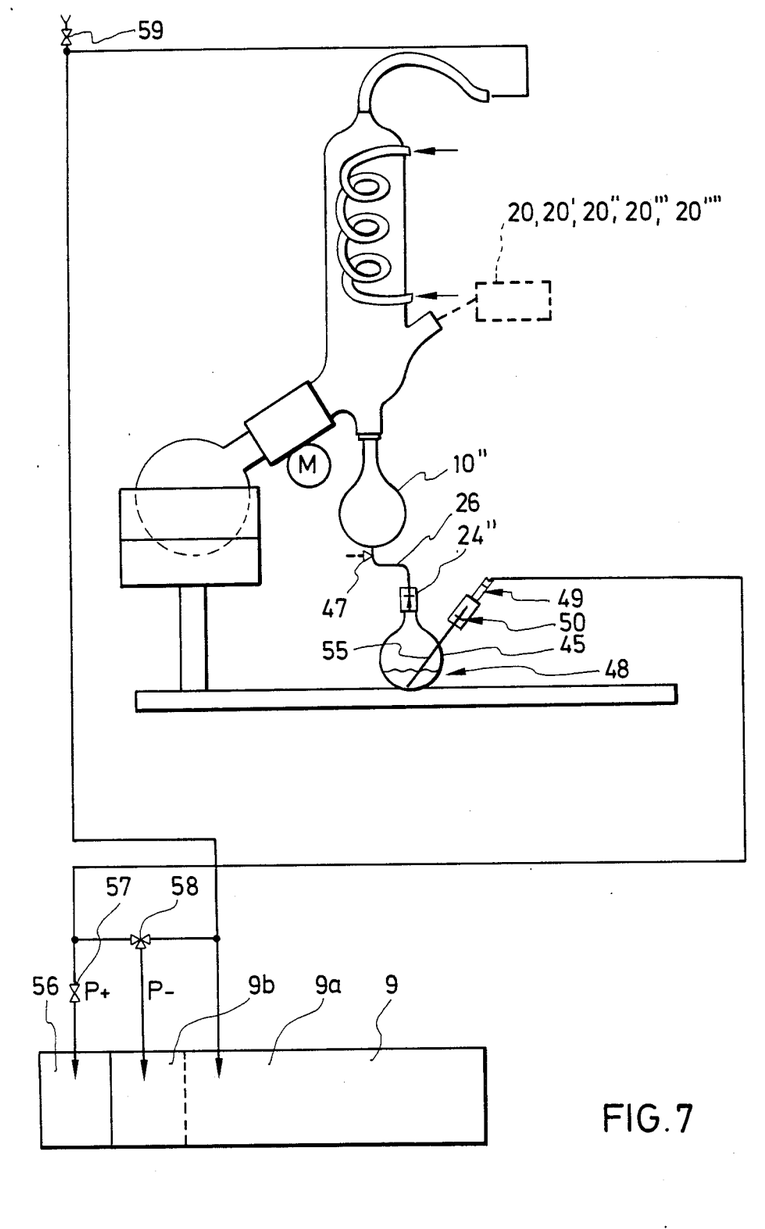
FIG. 7 shows a rotary evaporator having a distillate discharge arrangement according to another embodiment of the invention.

FIG. 7 shows a particularly advantageous embodiment of an arrangement according to the invention for the discharge of the distillate. The shown distillate discharge arrangement may be employed in a rotary evaporator in combination with any of the metering receptacle embodiments 20, 20', 20", 20''' discussed above, or in combination with any other suitable metering device.

In the emodiment of FIG. 7, vacuum conduit 26 connected to distillate collector receptacle 10" is provided with an outlet valve in the form of a non-return valve 24" leading to a discharge receptacle 45 disposed therebelow. The volume of discharge receptacle 45 is considerably greater than that of collector receptacle 10 which in the present embodiment is only required for temporary transitional storage of the distillate.

Connected to discharge receptacle 45 is a further nonreturn valve 49 cooperating with a suction pipe 55 for the discharge of the distillate. Non-return valve 49 is disposed in an opening 50 selectively permitting an overpressure P+ to be applied to discharge receptacle 45 via a conduit 49 by means of a diaphragm compressor 56, or a vacuum P− to be applied thereto by the action of vacuum pump 9. Vacuum pump 9 is preferably a cyclic liquid jet pump having two circuits 9a and 9b, resulting in the advantage that the vacuum for discharge receptacle 45 may be generated by circuit 9b without affecting the system vacuum generated by circuit 9a.

The selective application of the overpressure and vacuum, respectively, is controlled by suitably actuating valves 57 and 58.

Also shown in this figure is a valve 59 for venting the system on termination of the distillation process, to which purpose a similar valve is likewise provided in all of the other embodiments.

In the embodiment of FIG. 7, the distillate is discharged in the following manner: At the beginning of the distillation process, valve 58 is operated to generate a vacuum in discharge receptacle 45 by the action of second circuit 9b of vacuum pump 9. At this instant non-return valve 50 is closed, while non-return valve 24" in vacuum conduit 26 is opened due to a substantial pressure equilibrium prevailing in the vacuum system and in discharge receptacle 45, to thereby establish communication between distillate collector receptacle 10 and discharge receptacle 45. The distillate produced by the distillation process is thus permitted to flow through collector receptacle 10 into discharge receptacle 45, until a sensor 48 adjacent the bottom of discharge receptacle 45 and a sensor 47 associated with vacuum conduit 26 generate respective signals indicative of the maximum filling level. This causes valve 58 to be closed under the control of the processor (not shown) to thereby separate discharge container 45 from the vacuum source. Subsequently valve 57 is opened to connect discharge receptacle 45 to diaphragm compressor 56. The overpressure generated by the action of diaphragm compressor 56 causes non-return valve 24" to close, and non-return valve 50 to open. The overpressure is then effective to chase the distillate from discharge receptacle 45 until sensor 48 indicates the minimum filling leve to have been attained. Thereupon valve 57 is closed and the operation of diaphragm compressor 56 is stopped, as a result of which the overpressure generated in discharge receptacle drops to zero during a waiting period of for instance 5 seconds. The thus emptied discharge receptacle 45 is then again connected to vacuum circuit 9b by suitably operating valve 58. Since vacuum pump 9 includes two separate circuits, the vacuum system in the rotary evaporator is not affected by the evacuation of discharge receptacle 45.

As soon as the pressure in discharge receptacle 45 subsequently equals the pressure within the rotary evaporator plus the pressure exerted by the liquid column in collector receptacle 10 on non-return valve 24", the latter is caused to open by itself so as to permit the distillate meanwhile collected in collector receptacle 10 to drain into the lower receptacle. These operations are periodically repeated under the control of respective signals generated by sensors 47 and 48.

The embodiment described above obviously permits the distillate to be discharged without requiring the evaporator to be vented, enabling the evaporator to be continuously operated under automatic control in a simple manner. In conclusion it is to be noted that the various embodiments described of arrangement for metering the sample solution and of arrangements for discharging the distillate may be combined in any suitable manner.

We claim:

1. An evacuated rotary evaporator comprising:
a heated rotary flask for evaporating sample solution;
a condenser connected to the rotary flask for condensing vapor;
a sample supply passage having first and second ends, the first end connected to the rotary flask;
metering means, connected to the second end of the sample supply passage, for metering predetermined volumes of sample solution into the second end of the sample supply passage during operation of the evaporator;
isolating means for selectively isolating the metering means from the sample supply passage;
a distillate collector receptacle connected to the condenser;
an output conduit connected to the distillate collector receptacle;
closing means for selectively closing the output conduit; and
a vacuum system constructed and arranged so as to continously maintain the rotary flask, condenser, sample supply passage, distillate collector receptacle and output conduit under a substantially constant vacuum, whereby sample solution is continuously introduced into the sample supply passage and distillate is removed from the output conduit without interrupting operation of the evaporator.

2. The evaporator of claim 1, including a controller and arranged so as to control the operation of the isolating means and closing means, wherein the metering means is positioned above the sample supply second end, wherein the distillate collector receptacle is positioned below the condenser, and wherein the output conduit is positioned below the distillate collector receptacle, whereby operation of the isolating and closing means causes sample fluid to flow from the metering means to the rotary flask and distillate from the condenser to flow through the distillate collector receptacle to the output conduit under the influence of gravity.

3. The evaporator of claim 1 wherein the metering means includes a metering flask having an upper end and a lower end, wherein the lower end is connected to the vacuum system.

4. The evaporator according to claim 3, including a connection conduit extending between said metering flask and said vacuum system and extending into said metering flask as a suction pipe terminating adjacent the upper end of said metering flask.

5. The evaporator of claim 3 wherein the isolating means includes a three-way valve having three ports, and wherein the lower end of the metering flask has an opening connected to one port of the three-way valve, wherein a second port of the three-way valve is connected to the second end of the sample supply passage, and wherein a third port of the three-way valve is connected to a supply for sample solution.

6. The evaporator according to claim 3, including a servo motor arranged for operating said three-way valve.

7. The evaporator according to claim 3, including sensors on said metering flask for determining maximum and minimum filling levels.

8. The evaporator of claim 1 wherein the metering means includes a sample metering receptacle having an upper chamber for receiving sample solution under ambient pressure, a lower cylindrical chamber, a first opening between the upper and lower chambers, and a second opening aligned with the first opening wherein the sample metering receptacle also has a rotary piston sealingly received in the lower cylindrical chamber and a metering chamber in the rotary piston axially positioned to alternately communicate the first and second openings, whereby sample solution under ambient pressure is introduced into the evacuated sample supply passage without interrupting operation of the evaporator.

9. The evaporator according to claim 8, including a squeeze pump connected to the upper chamber of the sample metering receptacle by a conduit so that sample solution is introduced into the evacuated sample supply passage without interrupting operation of the evaporator.

10. The evaporator according to claim 1 wherein said metering means includes a minimum fill level sensor, a squeeze pump connected to said metering means by a three-way valve, and control means for controlling the three-way valve so that said three-way valve is operable to fill said metering receptacle to at least a minimum filling level under control of the sensor.

11. The evaporator according to claim 1 wherein the vacuum system has a hose connected to the distillate collector receptacle and a squeeze pump operable to generate a vacuum in the hose for reclaiming the distillate and at the same time for maintaining the vacuum in the distillate collector receptacle.

12. The evaporator according to claim 11, including a sensor on said distillate collector receptacle for determining a minimum filling level.

13. The evaporator of claim 1 wherein the isolating means includes an inlet switch valve, wherein the closing means includes an outlet switch valve, and wherein the metering means includes a cylinder having a first opening connected to the inlet switch valve, a second opening connected to the outlet valve and an internal, double-acting reciprocating piston, so that sample solution is aspirated and dispensed through the inlet switch valve to the sample supply passage second end by one cycle of the reciprocating piston, and so that distillate is removed from the output conduit and expelled through the outlet switch valve by the same cycle of the reciprocating piston.

14. The evaporator of claim 1, including a secondary discharge receptacle connected to the output conduit below the distillate collector receptacle, wherein the closing means has a non-return valve therebetween to permit distillate flow from the distillate collector receptacle to the secondary discharge receptacle at least when the receptacles are in pressure equilibrium.

15. The evaporator according to claim 14, including an overpressure source connected to the secondary discharge receptacle.

16. The evaporator according to claim 15, including sensors positioned and arranged for determining a maximum and a minimum filling level in said secondary discharge receptacle and in said output conduit, respectively.

17. The evaporator according to claim 14 wherein said secondary discharge receptacle has a non-return valve which opens in response to an overpressure in said secondary discharge receptacle and which communicates with a distillate discharge conduit.

* * * * *